3,264,327
17α-FLUORO-, 17β-CHLOROFLUOROACETOXY- AND 17β-METHYL-Δ⁴- AND Δ⁵-ANDROSTENE DERIVATIVES
Lawrence H. Knox, Mexico City, Mexico, assignor to Syntex Corporation, Panama, Panama, a corporation of Panama
No Drawing. Filed Mar. 19, 1964, Ser. No. 353,263
Claims priority, application Mexico, July 27, 1962, 68,398
22 Claims. (Cl. 260—397)

This application is a continuation-in-part of my co-pending patent application Serial No. 221,424, filed September 5, 1962, now abandoned.

The present invention relates to certain novel cyclopentanophenanthrene derivatives and to a method for making the same.

More particularly, this invention relates to certain novel 17α-fluoro, 17β-chlorofluoroacetoxy, and 17β-methyl derivatives of the androstane series, represented by the following formulas:

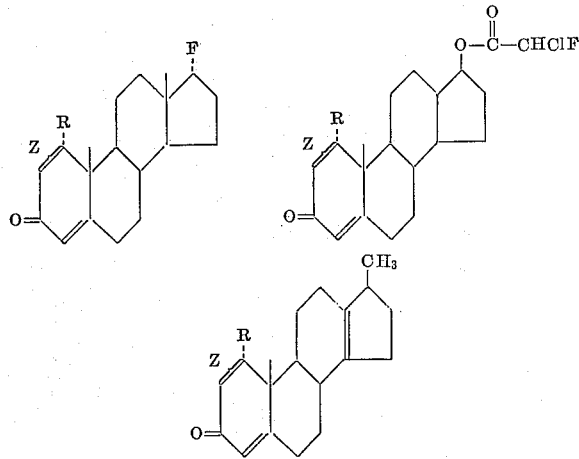

In the above formulas R represents hydrogen, lower alkyl, alkenyl or alkinyl group such as methyl, ethyl, propyl, vinyl, propenyl, ethinyl, propinyl, etc. and Z represents a single or a double bond between C-1 and C-2.

The present invention refers also to the corresponding 19-nor-Δ⁴-compounds unsubstituted at C-1, and to certain novel 3β-fluoro, 3β,17α-difluoro, 3β-fluoro-17β-chlorofluoroacetoxy and 3β-fluoro-17α-methyl derivatives of Δ⁴ and Δ⁵-androstenes.

The compounds of the present invention are anabolic agents with a favorable anabolic-androgenic ratio. In addition, they have antiestrogenic, anti-gonadotrophic and anti-fibrillatory properties, lower the blood cholesterol level and inhibit the activity of the pituitary gland.

The substitition of primary and secondary hydroxyl groups by a fluorine atom has been described in the literature, for example by N. N. Yarovenko et al. in the Journal of General Chemistry of the USSR, vol. 29, 2159 (1959).

In accordance with the present invention, it has been found that the treatment of 17β-secondary hydroxy steroids with 2-chloro-1,1,2-trifluorotriethylamine in a suitable organic solvent produces three compounds: the 17α-fluoro-steroid resulting from the replacement of the hydroxy group by fluorine, with simultaneous inversion of configuration, the 17β-chlorofluoroacetoxy compound and the dehydration product with migration of the 13β-methyl group.

The method for producing the 17α-fluoro, 17β-chlorofluoroacetoxy and 17β-methyl-Δ⁴-3-keto androstenes and the corresponding 1-dehydro and 1-substituted derivatives is illustrated by the following equations:

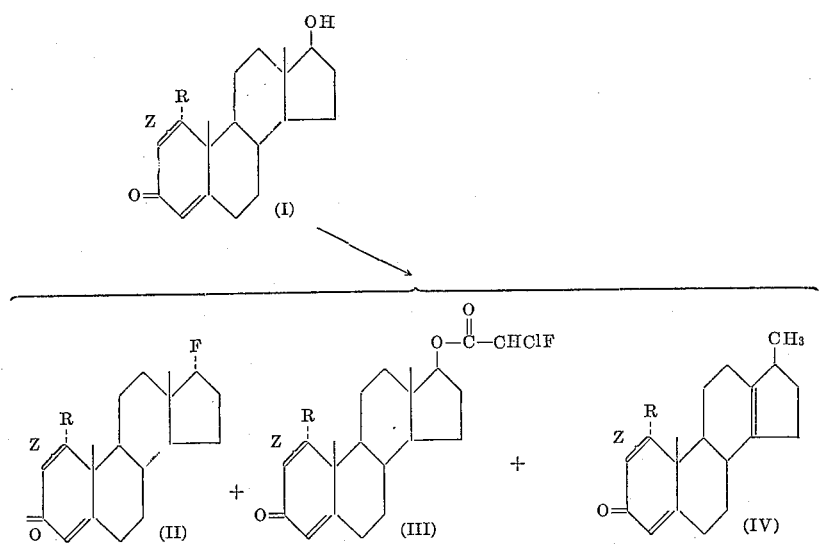

In the above formulas R and Z have the same meaning as heretofore indicated.

In practicing the process outlined above, the starting materials, testosterone, 1-dehydro-testosterone and the corresponding 1α-alkyl, alkenyl or alkinyl substituted derivatives (I) are treated with 1 to 1.5 molar equivalents of 2-chloro-1,1,2-trifluorotriethylamine in an inert organic solvent, at a temperature comprised between room temperature and the steam bath, for a period of time of between 5 minutes to 3 hours. The solvent is then evaporated to dryness under vacuum, and the residue chromatographed on Florisil or neutral alumina, to produce the 17α-fluoro-(II), 17β-chlorofluoroacetoxy-(III) and 17β-methyl-$\Delta^{13}$-(IV) derivatives.

Adequate solvents for this reaction are: acetonitrile, ethers such as diethylether, isopropyl ether, dioxane, tetrahydrofuran, Dowanol, and the like, aromatic hydrocarbons such as benzene, toluene, xylene, etc.; in general, the reaction can be carried out in any organic solvent containing no acidic hydrogen.

The $\Delta^4$-3-keto compounds can be converted into the corresponding 1-dehydro derivatives by reaction with 2,3-dichloro-5,6-dicyano-1,4-benzoquinone.

The 1α-alkyl, alkenyl and alkinyl substituted testosterones used as starting materials are obtained by reaction of 19-hydroxy-$\Delta^4$-androstene-3,17-dione with 2-chloro-1,1,2-trifluorotriethylamine to produce a mixture of 5,10-methylene-19-nor-$\Delta^1$-androstene-3,17-dione and 5,10 - seco - 5,19 - cyclo - 10β - fluoro - $\Delta^4$ - androstene-3,17-dione, which is separated by chromatography, reduction of 5,10-methylene-19-nor-$\Delta^1$-androstene-3,17-dione with lithium aluminum hydride to the 3,17-diol and selective oxidation at C-3 with manganese dioxide to produce 5,10-methylene-19-nor-$\Delta^1$-androsten-17β-ol-3-one, reaction of this compound with a Grignard reagent and acid treatment of thus obtained 1α-substituted-5,10-methylene-19-nor-androstane componds, as described in my copending patent application Serial No. 286,931, filed June 11, 1963, now U.S. Patent No. 3,184,484, and Serial No. 246,074 filed February 20, 1964.

By reaction of 19-nor-testosterone with 1.1 to 1.5 molar equivalents of 2-chloro-1,1,2-trifluorotriethylamine, following the same procedure as hereinbefore described for testosterone, 1-dehydrotestosterone and the corresponding 1-substituted derivatives, there are produced 17α-fluoro-$\Delta^4$-19-nor-androsten-3-one, 17β-chlorofluoroacetoxy-$\Delta^4$-19-nor-androsten-3-one and 17β-methyl-$\Delta^{4,13}$-18,19-bisnor-androstadien-3-one.

The 3β,17α-difluoro-, 3β-fluoro-17β-chlorofluoroacetoxy- and 3β-fluoro-17β-methyl-$\Delta^{13}$-derivatives of $\Delta^4$ and $\Delta^5$-androstenes, which are also objects of the present invention, are obtained by reaction of $\Delta^4$-androstene-3β,17β-diol and $\Delta^5$-androstene-3β,17β-diol with 2 to 2.5 molar equivalents of the fluorinated amine, following the above described procedure.

By treatment of $\Delta^5$-androsten-3β-ol-17-one with 1 to 1.5 molar equivalents of 2-chloro-1,1,2-trifluorotriethylamine, there is produced 3β-fluoro-$\Delta^5$-androsten-17-one. Upon reaction of the latter compound with a Grignard reagent such as methyl magnesium bromide, vinyl magnesium bromide or ethinyl magnesium bromide, in a conventional manner, there are produced the corresponding 3β-fluoro-17α-alkyl, alkenyl or alkinyl substituted derivatives of $\Delta^5$-androsten-17β-ol, which are conventionally esterified with acid anhydrides in benzene solution and in the presence of p-toluenesulfonic acid.

The following examples serve to illustrate but are not considered to limit the scope of the present invention:

Example I

A mixture of 3.5 g. of testosterone, 3.5 g. (1.5 molar equivalents) of 2-chloro-1,1,2-trifluorotriethylamine and 40 cc. of anhydrous acetonitrile was kept at room temperature for 30 minutes and then evaporated to dryness in vacuo, at room temperature. The residue was adsorbed from hexane onto 200 g. of Florisil. The fractions eluted with hexane gave 17β-methyl-$\Delta^{4,13}$-18-nor-androstadiene-3-one, M.P. 112–113° C.; $[\alpha]_D$ +69° (CHCl$_3$); λ max. 238–240 mμ; log ε 4.23; ν max. 1680 and 1620 cm.$^{-1}$ (enone).

Further elution of the column with hexane-ether (9:1) afforded 17α-fluoro-$\Delta^4$-androsten-3-one, M.P. 146–148° C.; $[\alpha]_D$ +96° (CHCl$_3$); λ max. 240–242 mμ; log ε 4.23 ν max. 1685, 1615 cm.$^{-1}$ (enone).

Further elution with hexane-ether (1:1) gave 17β-chlorofluoroacetoxy-$\Delta^4$-androsten - 3 - one (testosterone chlorofluoroacetate), M.P. 177–179° C.; $[\alpha]_D$ +81° (CHCl$_3$); λ max. 240–242 mμ; log ε 4.21; ν max. 1660 and 1615 (enone), 1775 and 1205 cm.$^{-1}$ (chlorofluoroacetate-ester).

Example II

To a solution of 2 g. of testosterone in 25 cc. of methylene chloride, there was added 1.1 molar equivalents of 2-chloro-1,1,2-trifluorotriethylamine and the reaction mixture was refluxed for 10 minutes under anhydrous conditions. It was then evaporated to dryness at room temperature, under reduced pressure, and the residue chromatographed on 100 g. of neutral alumina, to produce 17β-methyl-$\Delta^{4,13}$-18-nor-androstadien-3-one; 17α - fluoro-$\Delta^4$-androsten-3-one and 17β-chlorofluoroacetoxy-$\Delta^4$-androsten-3-one, identical to the products obtained in the preceding example.

Example III

Example I was repeated but using tetrahydrofuran as solvent, with the same results.

Evxample IV

Example I was repeated but the reaction mixture was allowed to stand at room temperature overnight. Similar results were obtained.

Example V

In accordance with the method described in Example I, the compounds mentioned below under I were converted into the products set forth under II, which were separated by chromatography.

| I | II |
|---|---|
| $\Delta^1$-dehydro-testosterone | 17β-methyl-$\Delta^{1,4,13}$-18-nor-androstatrien-3-one; 17α-fluoro-$\Delta^{1,4}$-androstadien-3-one; and 17β-chlorofluoroacetoxy-$\Delta^{1,4}$-androstadien-3-one. |
| 1α-methyl-testosterone | 1α, 17β-dimethyl-$\Delta^{4,13}$-18-nor-androstadien-3-one; 1α-methyl-17α-fluoro-$\Delta^4$-androsten-3-one; and 1α-methyl-17β-chlorofluoroacetoxy-$\Delta^4$-androsten-3-one. |
| 1α-ethyl-testosterone | 1α-ethyl-17β-methyl-$\Delta^{4,13}$-18-nor-androstadien-3-one; 1α-ethyl-17α-fluoro-$\Delta^4$-androsten-3-one; and 1α-ethyl-17β-chlorofluoroacetoxy-$\Delta^4$-androsten-3-one. |
| 1α-propyl-testosterone | 1α-propyl-17β-methyl-$\Delta^{4,13}$-18-nor-androstadien-3-one; 1α-propyl-17α-fluoro-$\Delta^4$-androsten-3-one; and 1α-propyl-17β-chlorofluoroacetoxy-$\Delta^4$-androsten-3-one. |
| 1α-vinyl-testosterone | 1α-vinyl-17β-methyl-$\Delta^{4,13}$-18-nor-androstadien-3-one; 1α-vinyl-17α-fluoro-$\Delta^4$-androsten-3-one; and 1α-vinyl-17β-chlorofluoroacetoxy-$\Delta^4$-androsten-3-one. |
| 1α-ethinyl-testosterone | 1α-ethinyl-17β-methyl-$\Delta^{4,13}$-18-nor-androstadien-3-one; 1α-ethinyl-17α-fluoro-$\Delta^4$-androsten-3-one; and 1α-ethinyl-17β-chlorofluoroacetoxy-$\Delta^4$-androsten-3-one. |
| 1α-propenyl-testosterone | 1α-propenyl-17β-methyl-$\Delta^{4,13}$-18-nor-androstadien-3-one; 1α-propenyl-17α-fluoro-$\Delta^4$-androsten-3-one; and 1α-propenyl-17β-chlorofluoroacetoxy-$\Delta^4$-androsten-3-one. |
| 1α-propinyl-testosterone | 1α-propinyl-17β-methyl-$\Delta^{4,13}$-18-nor-androstadien-3-one; 1α-propinyl-17α-fluoro-$\Delta^4$-androsten-3-one; and 1α-propinyl-17β-chlorofluoroacetoxy-$\Delta^4$-androsten-3-one. |
| 1-methyl-$\Delta^{1,4}$-androstadien-17β-ol-3-one. | 1,17β-dimethyl-$\Delta^{1,4,13}$-18-nor-androstatrien-3-one; 1-methyl-17α-fluoro-$\Delta^{1,4}$-androstadien-3-one; and 1-methyl-17β-chlorofluoroacetoxy-$\Delta^{1,4}$-androstadien-3-one. |

Example VI

A mixture of 500 mg. of 17α-fluoro-Δ⁴-androsten-3-one, 10 cc. of dioxane and 350 mg. of 2,3-dichloro-5,6-dicyano-1,4-benzoquinone was refluxed for 10 hours. It was then cooled, the 2,3-dichloro-5,6-dicyano-1,4-benzohydroquinone formed during the reaction filtered off and the filtrate evaporated to dryness. The residue was dissolved in acetone and filtered through 10 g. of alumina. Crystallization from acetone-hexane gave the pure 17α-fluoro-Δ¹,⁴-androstadien-3-one, identical to that obtained in Example V.

By the same method 1α-ethyl-17β-methyl-Δ⁴,¹³-18-nor-androstadien-3-one, 1α-vinyl-17α-fluoro-Δ⁴-androsten-3-one and 1α-ethinyl-17β-chlorofluoroacetoxy-Δ⁴-androsten-3-one were converted respectively into 1-ethyl-17β-methyl-Δ¹,⁴,¹³-18-nor-androstatrien-3-one, 1-vinyl-17α-fluoro-Δ¹,⁴-androstadien-3-one and 1-ethinyl-17β-chlorofluoroacetoxy-Δ¹,⁴-androstadien-3-one.

Example VII

To a solution of 1 g. of 17α-methyl-Δ⁵-androstene-3β,17β-diol-17-acetate in 15 cc. of anhydrous tetrahydrofuran, there was added 1.1 molar equivalents of 2-chloro-1,1,2-trifluorotriethylamine and the reaction mixture was refluxed for 10 minutes and then evaporated to dryness under reduced pressure. The residue was purified by chromatography on Florisil, thus producing the pure 3β-fluoro-17α-methyl-Δ⁵-androsten-17β-ol acetate.

By the same method Δ⁵-androsten-3β-ol-17-one, 6-methyl-Δ⁵-androsten-3β-ol-17-one and 17α-methyl-Δ⁵-androstene-3β,11β,17β-triol-11,17 - dipropionate were converted respectively into 3β-fluoro-Δ⁵-androsten-17-one, 3β - fluoro - 6 - methyl - Δ⁵ - androsten - 3β - ol - 17 - one and 3β fluoro - 17α - methyl - Δ⁵ - androstene - 11β,17β-diol dipropionate.

Example VIII

A solution of 2 g. of 3β-fluoro-Δ⁵-androsten-3-one in 60 cc. of anhydrous benzene was added, under an atmosphere of nitrogen to a solution of potassium amyloxide previously prepared from 1.4 g. of potassium in 30 cc. of amyl alcohol. A slow stream of purified acetylene was then introduced into the resulting solution for 40 hours and the solution was then poured into ice water and extracted with several portions of benzene. The combined extract was washed to neutral, the organic layer was dried over anhydrous sodium sulfate and evaporated to dryness under vacuum. The residue was chromatographed on 50 times its weight of washed alumina, and the solid fractions were recrystallized from acetone-hexane, thus yielding 3β-fluoro-17α-ethinyl-Δ⁵-androsten-17β-ol.

To a solution of 500 mg. of the foregoing compound in 10 cc. of anhydrous benzene there were added 100 mg. of p-toluenesulfonic acid and 1.5 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the acetate of 3β-fluoro-17α-ethinyl-Δ⁵-androsten-17β-ol.

Example IX

By following the method of Example I but using 2.2 molar equivalents of 2-chloro - 1,1,2-trifluorotriethylamine, Δ⁵-androstene-3β,17β-diol was converted into 3β-fluoro-17β-methyl-Δ⁵,¹³-18-nor-androstadiene, 3β,17α-difluoro-Δ⁵-androstene and 3β-fluoro-17β-chlorofluoroacetoxy-Δ⁵-androstene which were separated by chromatography on Florisil.

In a similar manner, starting from Δ⁴-androstene-3β,17β-diol, there were produced 3β-fluoro-17β-methyl-Δ⁴,¹³-18-nor-androstadiene, 3β,17α-difluoro-Δ⁴-androstene and 3β-fluoro-17β-chlorofluoroacetoxy-Δ⁴-androstene.

I claim:
1. A compound of the following formula:

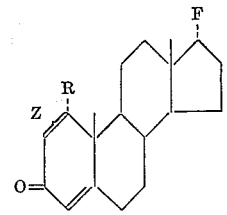

wherein R is selected from the group consisting of hydrogen, lower alkyl, lower alkenyl and lower alkinyl, and Z is selected from the group consisting of a double bond and a saturated linkage between C–1 and C–2.

2. 17α-fluoro-Δ⁴-androsten-3-one.
3. 17α-fluoro-Δ¹,⁴-androstadien-3-one.
4. 1α-methyl-17α-fluoro-Δ⁴-androsten-3-one.
5. A compound of the following formula:

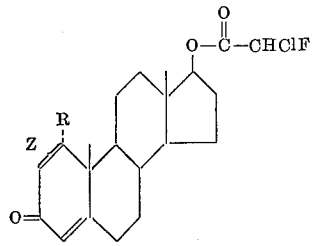

where R is selected from the group consisting of hydrogen, lower alkyl, lower alkenyl and lower alkinyl, and Z is selected from the group consisting of a double bond and a saturated linkage between C–1 and C–2.

6. 17β-chlorofluoroacetoxy-Δ⁴-androsten-3-one.
7. 17β-chlorofluoroacetoxy-Δ¹,⁴-androstadien-3-one.
8. 1-methyl - 17β-chlorofluoroacetoxy - Δ¹,⁴-androstadien-3-one.
9. A compound of the following formula:

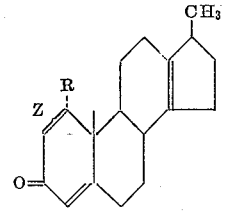

wherein R is selected from the group consisting of hydrogen, lower alkyl, lower alkenyl and lower alkinyl, and Z is selected from the group consisting of a double bond and a saturated linkage between C–1 and C–2.

10. 17β-methyl-Δ⁴,¹³-18-nor-androstadien-3-one.
11. 17β-methyl-Δ¹,⁴,¹³-18-nor-androstatrien-3-one.
12. 1,17β-dimethyl-Δ¹,⁴,¹³-18 - nor-androstatrien-3-one.
13. 17α-fluoro-Δ⁴-19-nor-androsten-3-one.
14. 17β-chlorofluoroacetoxy - Δ⁴-19-nor - androsten-3-one.
15. 17β-methyl-Δ⁴,¹³-18,19-bisnor-androstadien-3-one.
16. 3β,17α-difluoro-Δ⁵-androstene.
17. 3β-fluoro-17β-chlorofluoroacetoxy-Δ⁵-androstene.
18. 3β-fluoro-17β-methyl-Δ⁵,¹³-18-nor-androstadiene.
19. 3β,17α-difluoro-Δ⁴-androstene.

20. 3β-fluoro-17β-chlorofluoroacetoxy-$\Delta^4$-androstene.
21. 3β-fluoro-17β-methyl-$\Delta^{4,13}$-18-nor-androstadiene.
22. The acetate of 3β-fluoro-17α-ethinyl-$\Delta^5$-androsten-17β-ol.

References Cited by the Examiner

UNITED STATES PATENTS

| | | | |
|---|---|---|---|
| 2,981,659 | 4/1961 | Fonken et al. | 195—51 |
| 3,076,828 | 2/1963 | Wettstein et al. | 260—397.45 |
| 3,077,482 | 2/1963 | Wettstein et al. | 260—397.1 |

OTHER REFERENCES

Fieser et al.—Steroids, pages 445, 479 and 595 (1959), Reinhold Pub. Co., New York.

Mori et al.: Chem. & Pharm. Bull. 11, pages 684–85 (1963).

Westphal et al.: Berichte 72, pp. 1233–42 (1939).

LEWIS GOTTS, *Primary Examiner.*

HENRY A. FRENCH, *Assistant Examiner.*